United States Patent
Becker et al.

(10) Patent No.: US 12,526,902 B2
(45) Date of Patent: Jan. 13, 2026

(54) MULTIPROTOCOL WIRELESS LIGHTING DEVICE

(71) Applicant: Tridonic GmbH & Co KG, Dornbirn (AT)

(72) Inventors: Markus Becker, Lindau (DE); Rochus Wohlgenannt, Dornbirn (AT); Frank Lochmann, Achberg (DE); Norbert Linder, Dornbirn (AT); Lukas Simma, Hohenweiler (AT)

(73) Assignee: Tridonic GmbH & Co KG, Dornbirn (AT)

( * ) Notice: Subject to any disclaimer, the term of this patent is extended or adjusted under 35 U.S.C. 154(b) by 19 days.

(21) Appl. No.: 18/721,439

(22) PCT Filed: Jan. 24, 2023

(86) PCT No.: PCT/EP2023/051703
§ 371 (c)(1),
(2) Date: Jun. 18, 2024

(87) PCT Pub. No.: WO2023/148051
PCT Pub. Date: Aug. 10, 2023

(65) Prior Publication Data
US 2025/0071877 A1    Feb. 27, 2025

(30) Foreign Application Priority Data
Feb. 2, 2022 (EP) .................................... 22154661

(51) Int. Cl.
*H05B 47/19* (2020.01)
*H05B 47/175* (2020.01)

(52) U.S. Cl.
CPC ........... *H05B 47/19* (2020.01); *H05B 47/199* (2024.01)

(58) Field of Classification Search
CPC ........ H05B 45/00; H05B 45/20; H05B 45/24; H05B 45/37; H05B 45/40; H05B 47/105;
(Continued)

(56) References Cited

U.S. PATENT DOCUMENTS

2011/0153818 A1    6/2011   Vandwalle et al.
2019/0320515 A1*  10/2019   Sadwick .................. F21K 9/27
2024/0130002 A1*   4/2024   Khanna ............... H04W 74/006

FOREIGN PATENT DOCUMENTS

EP          3057382 A2       8/2016
WO     2016138516 A1         9/2016

OTHER PUBLICATIONS

PCT/EP2023/051703, International Search Report and Written Opinion dated Feb. 16, 2023, 5 pages.

* cited by examiner

*Primary Examiner* — Monica C King
(74) *Attorney, Agent, or Firm* — Andrus Intellectual Property Law, LLP

(57) ABSTRACT

Disclosed is a network device (1) of a lighting system. The network device (1) comprises a wireless interface (11) and a control unit (12). The control unit (12) is configured to advertise (21), over the wireless interface (11), at least two different wireless networking standards; receive (22), over the wireless interface (11), a response to an advertisement of one of the wireless networking standards; and activate (23) the wireless interface (11) for operation in accordance with the one of the wireless networking standards. This avoids a more extensive stock keeping for lighting systems being capable of wireless communications.

14 Claims, 2 Drawing Sheets

(58) Field of Classification Search
CPC ...... H05B 47/11; H05B 47/16; H05B 47/185; H05B 47/1965; H05B 47/00; H04W 4/70; H04W 4/40; H04W 4/80; H04W 4/38; H04W 4/029; H04W 12/08; H04W 4/90; H04W 40/22; H04W 72/0453; H04W 12/033; H04W 4/02; H04W 4/06; H04W 84/12; H04W 52/16; H04W 52/246; H04W 52/362; H04W 12/06; H04W 28/0268; H04W 88/10; H04W 24/02; H04W 24/08; H04W 28/0231; H04W 4/08; H04W 56/001; H04W 88/08; H04W 12/02; H04W 16/14; H04W 24/10; H04W 72/51; H04W 24/04; H04W 28/0236; H04W 28/06; H04W 28/20; H04W 28/24; H04W 72/0446; H04W 8/18; H04W 8/22; H04W 84/18; H04W 88/085; H04W 28/084; H04W 36/322; H04W 4/027; H04W 48/16; H04W 48/18; H04W 74/0816; H04W 76/11; H04W 76/16; H04W 8/005; H04W 84/047; H04W 88/06; H04W 12/108; H04W 12/12; H04W 28/18; H04W 4/023; H04W 4/024; H04W 40/12; H04W 72/542; H04W 88/18; H04W 16/26; H04W 28/04; H04W 28/10; H04W 36/04; H04W 4/025; H04W 4/44; H04W 4/50; H04W 52/367; H04W 52/42; H04W 64/00; H04W 72/541; H04W 12/069; H04W 16/22; H04W 28/02; H04W 28/021; H04W 28/0226; H04W 28/0247; H04W 28/0252; H04W 28/0263; H04W 28/0273; H04W 28/0289; H04W 28/065; H04W 28/082; H04W 28/0858; H04W 28/086; H04W 28/0925; H04W 28/0958; H04W 28/26; H04W 36/0011; H04W 36/0061; H04W 36/0066; H04W 36/008357; H04W 36/00837; H04W 36/125; H04W 36/22; H04W 36/302; H04W 4/00; H04W 4/46; H04W 40/18; H04W 40/20; H04W 40/24; H04W 40/248; H04W 64/003; H04W 72/04; H04W 74/002; H04W 74/006; H04W 74/0808; H04W 74/0875; H04W 74/0891; H04W 76/10; H04W 76/14; H04W 76/15; H04W 8/082; H04W 80/02; H04W 84/042; H04W 92/18; H04W 12/03; H04W 12/61; H04W 12/63; H04W 16/18; H04W 16/20; H04W 16/28; H04W 28/0284; H04W 28/08; H04W 28/0975; H04W 28/14; H04W 4/021; H04W 4/24; H04W 4/35; H04W 40/02; H04W 48/06; H04W 48/08; H04W 52/0216; H04W 52/0229; H04W 52/0232; H04W 52/0235; H04W 52/0238; H04W 52/0245; H04W 52/028; H04W 52/243; H04W 56/0035; H04W 60/00; H04W 64/006; H04W 72/11; H04W 72/115; H04W 72/12; H04W 72/20; H04W 72/54; H04W 72/569; H04W 76/22; H04W 76/25; H04W 76/27; H04W 76/28; H04W 84/06; H04W 84/16; H04W 88/16; H04W 92/10; H04W 12/009; H04W 12/122; H04W 12/106; H04W 12/66; H04W 12/69; H04W 12/04; H04W 12/50; H04W 84/22; H04W 12/71; H04W 12/76; H04W 12/35; H04W 12/041; H04W 12/64; H04W 12/75; H04W 8/08; H04W 12/088; H04W 40/36; H04W 48/02; H04W 72/56; H04W 84/005; H04W 12/068; H04W 12/082; H04W 12/084; H04W 12/104; H04W 12/37; H04W 12/42; H04W 28/12; H04W 28/16; H04W 36/0072; H04W 36/008375; H04W 4/20; H04W 40/00; H04W 60/04; H04W 72/535; H04W 8/26; H04W 88/182; H04W 40/16; H04W 12/043; H04W 12/10; H04W 12/60; H04W 12/72; H04W 12/77; H04W 12/79; H04W 28/0865; H04W 36/0033; H04W 36/0079; H04W 36/037; H04W 36/305; H04W 4/026; H04W 4/12; H04W 4/33; H04W 40/026; H04W 40/244; H04W 48/12; H04W 52/0219; H04W 56/0015; H04W 56/002; H04W 68/005; H04W 72/02; H04W 72/121; H04W 72/1268; H04W 72/23; H04W 72/543; H04W 74/0833; H04W 8/20; H04W 8/205; H04W 8/24; H04W 80/06; H04W 12/121; H04W 36/087; H04W 36/165; H04W 40/125; H04W 40/28; H04W 48/10; H04W 52/0203; H04W 52/0258; H04W 56/004; H04W 76/18; H04W 76/19; H04W 76/20; H04W 76/40; H04W 8/30; H04L 67/12; H04L 9/50; H04L 63/20; H04L 9/0643; H04L 67/125; H04L 2209/805; H04L 67/566; H04L 41/5009; H04L 63/0823; H04L 63/10; H04L 63/101; H04L 41/5054; H04L 67/141; H04L 61/5069; H04L 67/14; H04L 41/5006; H04L 49/70; H04L 1/0002; H04L 1/18; H04L 2209/80; H04L 43/08; H04L 5/0064; H04L 67/02; H04L 69/08; H04L 41/0869; H04L 63/00; H04L 69/16; H04L 41/0896; H04L 43/04; H04L 47/783; H04L 63/0876; H04L 41/0823; H04L 67/565; H04L 2209/08; H04L 41/042; H04L 41/0853; H04L 41/344; H04L 45/125; H04L 47/125; H04L 47/2483; H04L 5/0055; H04L 63/062; H04L 63/126; H04L 67/1087; H04L 9/0866; H04L 9/32; H04L 12/4633; H04L 43/0876; H04L 47/34; H04L 67/1095; H04L 69/40; H04L 12/1403; H04L 41/0663; H04L 41/149; H04L 43/10; H04L 45/22; H04L 45/7453; H04L 47/622; H04L 47/748; H04L 47/788; H04L 61/4541; H04L 63/145; H04L 63/205; H04L 65/1073; H04L 41/0809; H04L 67/10; H04L 9/3239; H04L 67/51; H04L 67/1097; H04L 2209/56; H04L 41/5019; H04L 69/18; H04L 41/40; H04L 41/0806; H04L 67/306; H04L 67/34; H04L 67/562; H04L 9/3247; H04L 41/12; H04L 63/102; H04L 41/5025; H04L 67/289; H04L 69/22; H04L 4/5003; H04L 47/83; H04L 9/0825; H04L 1/0041; H04L 43/0852; H04L 43/16; H04L 9/3213; H04L 41/0894; H04L 43/0882; H04L 63/123; H04L 67/1093; H04L 9/3297; H04L 1/0076; H04L 1/1874; H04L 41/0895; H04L 47/28; H04L 5/0048; H04L 67/104; H04L 67/52; H04L 67/56;

H04L 9/0637; H04L 12/1407; H04L 41/0631; H04L 43/0888; H04L 45/20; H04L 45/24; H04L 61/3025; H04L 61/4505; H04L 61/5092; H04L 61/1046; H04L 67/63; H04L 9/3268; H04L 47/781; H04L 47/82; H04L 63/04; H04L 67/04; H04L 1/0009; H04L 1/16; H04L 1/1854; H04L 1/1867; H04L 27/0014; H04L 41/5058; H04L 43/20; H04L 5/0008; H04L 63/104; H04L 63/105; H04L 67/1074; H04L 67/142; H04L 2209/84; H04L 41/0843; H04L 41/147; H04L 41/16; H04L 63/08; H04L 67/60; H04L 12/66; H04L 41/0893; H04L 41/122; H04L 41/5051; H04L 47/127; H04L 47/32; H04L 49/90; H04L 63/0807; H04L 67/55; H04L 9/3278; H04L 43/0811; H04L 63/0272; H04L 63/0428; H04L 63/061; H04L 63/0815; H04L 63/1458; H04L 67/148; H04L 12/281; H04L 12/2814; H04L 41/0226; H04L 41/04; H04L 41/0661; H04L 41/083; H04L 41/145; H04L 41/28; H04L 43/0864; H04L 45/121; H04L 45/126; H04L 45/302; H04L 47/2408; H04L 47/2425; H04L 47/76; H04L 49/3009; H04L 5/14; H04L 63/0281; H04L 63/0838; H04L 63/12; H04L 65/1036; H04L 67/025; H04L 67/303; H04L 67/75; H04L 9/0869; H04L 9/0894; H04L 9/3228; H04L 1/1642; H04L 41/0816; H04L 43/0835; H04L 47/283; H04L 47/30; H04L 5/0005; H04L 5/0041; H04L 63/029; H04L 63/1425; H04L 63/1433; H04L 63/162; H04L 65/1069; H04L 67/568; H04L 67/61; H04L 9/40; H04L 1/004; H04L 12/1877; H04L 12/189; H04L 12/4645; H04L 12/5692; H04L 2209/127; H04L 2212/00; H04L 41/0654; H04L 41/069; H04L 41/082; H04L 41/5022; H04L 43/087; H04L 43/50; H04L 45/127; H04L 45/38; H04L 45/64; H04L 45/74591; H04L 47/6215; H04L 47/72; H04L 47/746; H04L 47/765; H04L 49/109; H04L 49/15; H04L 49/3027; H04L 49/901; H04L 49/9094; H04L 5/003; H04L 5/0037; H04L 61/2503; H04L 61/2567; H04L 61/4511; H04L 63/0421; H04L 63/0442; H04L 63/0464; H04L 63/0884; H04L 63/107; H04L 63/1416; H04L 63/1441; H04L 63/1466; H04L 63/166; H04L 65/1016; H04L 65/1026; H04L 65/612; H04L 65/80; H04L 67/1001; H04L 67/1078; H04L 67/145; H04L 67/30; H04L 67/53; H04L 67/535; H04L 67/561; H04L 67/59; H04L 69/161; H04L 69/324; H04L 9/0822; H04L 9/0861; H04L 9/0891; H04L 9/0897; H04L 9/321; H04L 9/3215; H04L 9/3236; H04L 9/3263; H04L 9/3273; H04L 1/189; H04L 12/18; H04L 12/4641; H04L 2463/141; H04L 25/03006; H04L 25/03891; H04L 27/0006; H04L 27/2647; H04L 27/2657; H04L 41/0886; H04L 41/50; H04L 43/06; H04L 43/0858; H04L 43/106; H04L 47/52; H04L 47/56; H04L 5/0023; H04L 5/0051; H04L 5/0073; H04L 61/2514; H04L 61/2553; H04L 61/2578; H04L 63/0236; H04L 63/0846; H04L 63/0853; H04L 63/0869; H04L 63/1408; H04L 63/18; H04L 65/1046; H04L 65/611; H04L 67/5651; H04L 69/04; H04L 69/14; H04L 9/004; H04L 9/006; H04L 9/3234; H04L 9/3265

See application file for complete search history.

MULTIPROTOCOL WIRELESS LIGHTING DEVICE

CROSS REFERENCE TO RELATED APPLICATIONS

The present application is the U.S. national stage application of international application PCT/EP2023/051703 filed Jan. 24, 2023, which international application was published on Aug. 10, 2023 as International Publication WO 2023/148051 A1. The international application claims priority to European Patent Application No. 22154661.7 filed Feb. 2, 2022.

TECHNICAL FIELD OF THE INVENTION

The present disclosure relates to wireless communication for components of lighting systems, and in particular to a network device of said lighting system and a method of commissioning said network device.

BACKGROUND OF THE INVENTION

In lighting systems, wireless communications typically rely on a single wireless standard. As there is no predominant wireless standard for lighting systems yet, manufacturers need to provide multiple stock keeping units (i.e., different products) having different firmware if the full market should be served. In a supply chain, this issue is multiplied by the luminaire manufacturer, distributor, electrician, etc.

Further, WO 2016/138516 A1 refers to a Light Emitting Diode (LED) based illumination device including a Light Control and Data Interface Module (LCDIM). The LCDIM may include an LED driver that supplies electrical power to the LED based light engine of the LED based illumination module. The LCDIM may include a 25 radio frequency (RF) transmitter that communicates a signal indicative of an operational status of the LED based light engine to another device on a wireless communications network using a Bluetooth Low Energy (BLE) advertising packet.

Additionally, in a lighting control system, a light control device may include a RF transmitter to communicate a signal indicative of a lighting control command to the 30 LCDIM using a BLE advertising packet.

SUMMARY OF THE INVENTION

In view of the above-mentioned drawbacks and limitations, the present disclosure aims to improve a stock keeping of lighting systems of the background art.

The objective is achieved by the embodiments as defined by the appended independent claims. Further embodiments are set forth in the dependent claims and in the following description and drawings.

A first aspect of the present disclosure relates to a network device of a lighting system. The network device comprises a wireless interface and a control unit. The control unit is configured to advertise (i.e. send out information as to its compatibilities), over the wireless interface, at least two different wireless networking standards; receive, over the wireless interface, a response (from a remote participant who typically also is a lighting network device such as a driver, sensor etc)) to an advertisement of one of the wireless networking standards; and activate the wireless interface for operation in accordance with said one of the wireless networking standards (for which the response has been received from the participant).

The network device may comprise one of a gateway, a sensor, an actor, an LED driver, and an LED luminaire.

The wireless networking standards may comprise Bluetooth Mesh based on IEEE802.15.1, and Matter/Thread based on IEEE802.15.4.

The control unit may further be configured to advertise, over the wireless interface, the at least two different wireless networking standards in respective BLE advertisements. The advertising state is a defined state of a BLE device.

The control unit may further be configured to advertise, over the wireless interface, the at least two different wireless networking standards in a same BLE advertisement.

The control unit may further be configured to advertise, over the wireless interface, the at least two different wireless networking standards in a same frequency band.

The control unit may further be configured to advertise, over the wireless interface, the at least two different wireless networking standards using different modulation schemes.

The control unit may further be configured to advertise, over the wireless interface, the at least two different wireless networking standards concurrently.

The control unit may further be configured to advertise, over the wireless interface, the at least two different wireless networking standards sequentially.

The response may comprise a connection request.

The control unit may further be configured to activate the wireless interface for operation in accordance with the one of the wireless networking standards by disabling a first wireless networking firmware not being associated with the one of the wireless networking standards in the control unit.

The control unit may further be configured to activate the wireless interface for operation in accordance with the one of the wireless networking standards by enabling a second wireless networking firmware being associated with the one of the wireless networking standards in the control unit.

The control unit may further be configured to activate the wireless interface for operation in accordance with the one of the wireless networking standards by loading a third wireless networking firmware being associated with the one of the wireless networking standards into the control unit.

A second aspect of the present disclosure relates to a method of commissioning a network device of a lighting system. The method comprises advertising, over a wireless interface of the network device, at least two different wireless networking standards; receiving, over the wireless interface of the network device, a response to an advertisement of one of the wireless networking standards; and activating the wireless interface for operation in accordance with the one of the wireless networking standards.

The method may be performed by a network device of the first aspect or any of its implementations.

In view of multiple wireless standards for lighting systems without an apparent predominance, a more extensive stock keeping for lighting systems is avoided by a network device advertising multiple wireless networking standards and activating one of them depending on a response to the advertisement.

This results in less risk of supporting a wireless standard which may not ultimately be accepted well in the market, in an increased market coverage based on a single stock keeping unit, and in fewer stock keeping units at device manufacturers, luminaire manufacturers, distributors, electricians etc.

The technical effects and advantages described above in relation with the network device equally apply to the method having corresponding features.

BRIEF DESCRIPTION OF THE DRAWINGS

The above-described aspects and implementations will now be explained with reference to the accompanying drawings, in which the same or similar reference numerals designate the same or similar elements.

The features of these aspects and implementations may be combined with each other unless specifically stated otherwise.

Figure 1:
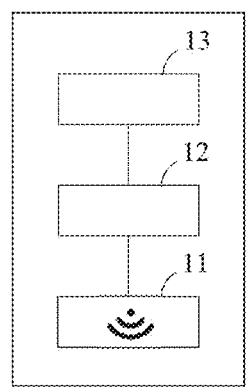

The drawings are to be regarded as being schematic representations, and elements illustrated in the drawings are not necessarily shown to scale. Rather, the various elements are represented such that their function and general purpose become apparent to those skilled in the art.

Figure 2:
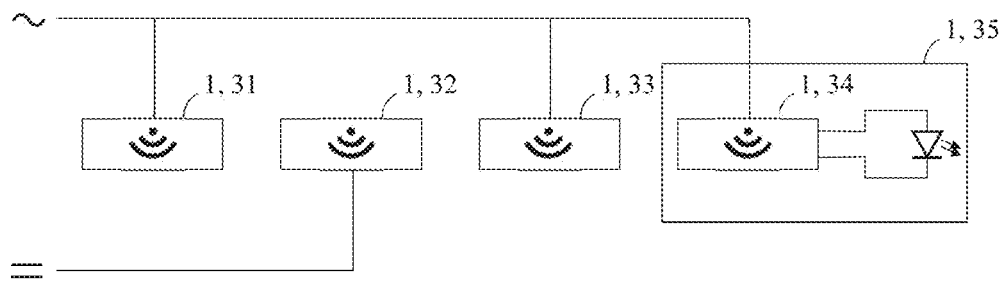
Figure 3:
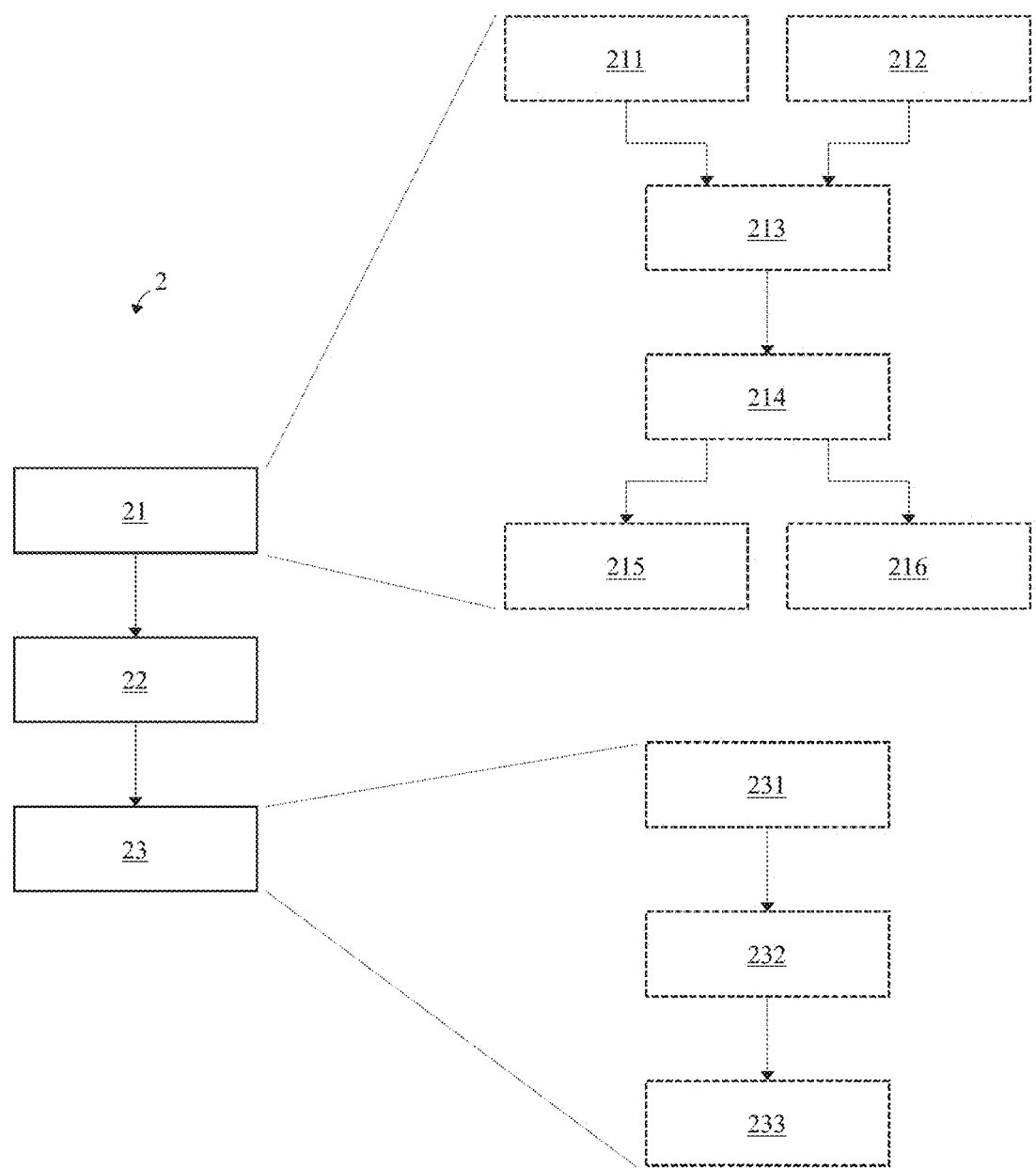

FIG. 1 illustrates a network device in accordance with the present disclosure;

FIG. 2 illustrates a lighting system in accordance with the present disclosure; and FIG. 3 illustrates a method in accordance with the present disclosure of commissioning a network device of a lighting system.

DETAILED DESCRIPTION OF THE DRAWINGS

FIG. 1 illustrates a network device 1 in accordance with the present disclosure.

A network device, preferably a building or lighting network device, as used herein may refer to a device of a lighting system having a networking capability, and in particular a wireless networking capability.

The network device 1 may comprise one of a gateway 31, a sensor 32, an actor 33, an LED driver 34, and an LED luminaire 35, as is illustrated in FIG. 2.

A (network) gateway or edge device as used herein may refer to a network device located at an edge of a lighting system and interfacing with an external network, such as a building network or the Internet.

A sensor as used herein may refer to a network device of a lighting system being configured to provide sensor readings.

An actor as used herein may refer to a network device of a lighting system being configured to perform electrical and/or mechanical actuation (e.g., actuation of sunshades).

An LED driver as used herein may refer to network device of a lighting system being configured to provide an LED light source with the appropriate electrical power. For example, an LED driver may be configured to convert alternating current (AC) power to direct current (DC) power tolerated by the LED light source.

The network device 1 comprises a wireless interface 11 and a control unit 12 for example combined in a system-on-chip (SoC).

A wireless interface as used herein may refer to a network interface being configured to connect to a wireless network in accordance with wireless networking standards, such as Bluetooth Mesh based on IEEE802.15.1, or Matter/Thread based on IEEE802.15.4.

Bluetooth Low Energy (BLE) as defined by the Bluetooth Special Interest Group (Bluetooth SIG) relates to an energy-efficient wireless personal area network (WPAN) technology forming part of Bluetooth 4.0. BLE is incompatible but coexistable with classic Bluetooth technology.

Bluetooth Mesh as defined by the Bluetooth SIG relates to a wireless networking standard enabling BLE-based mesh connectivity.

Matter as defined by the Connectivity Standards Alliance (CSA) relates to an emerging Wi-Fi/Thread/Bluetooth-based IPv6 home automation connectivity standard. Matter may operate on Wi-Fi and/or Thread network layers and may use BLE for commissioning.

The control unit 12 is configured to advertise 21, over the wireless interface 11, at least two different wireless networking standards. In particular, the wireless networking standards may comprise Bluetooth Mesh, and Matter, as already mentioned. As such, the at least two different wireless networking standards may be announced via radio.

The control unit 12 may further be configured to advertise 211, over the wireless interface 11, the at least two different wireless networking standards in respective BLE advertisements.

The control unit 12 may further be configured to advertise 212, over the wireless interface 11, the at least two different wireless networking standards in a same BLE advertisement.

The control unit 12 may further be configured to advertise 213, over the wireless interface 11, the at least two different wireless networking standards in a same frequency band.

The control unit 12 may further be configured to advertise 214, over the wireless interface 11, the at least two different wireless networking standards using different modulation schemes.

The control unit 12 may further be configured to advertise 215, over the wireless interface 11, the at least two different wireless networking standards concurrently.

The control unit 12 may further be configured to advertise 216, over the wireless interface 11, the at least two different wireless networking standards sequentially.

The control unit 12 is further configured to receive 22, over the wireless interface 11, a response to an advertisement of one of the wireless networking standards.

The response may comprise a connection request in accordance with the one of the wireless networking standards.

The response may be generated by a wireless system commissioning tool (not shown) being located or positioned within radio range of the network device 1.

The control unit 12 is further configured to activate 23 the wireless interface 11 for operation in accordance with the one of the wireless networking standards.

he control unit 12 may further be configured to activate 231 the wireless interface 11 for operation in accordance with the one of the wireless networking standards by disabling a first wireless networking firmware not being associated with the one of the wireless networking standards in the control unit 12.

The control unit 12 may further be configured to activate 232 the wireless interface 11 for operation in accordance with the one of the wireless networking standards by enabling a second wireless networking firmware being associated with the one of the wireless networking standards in the control unit 12.

The control unit 12 may further be configured to activate 233 the wireless interface 11 for operation in accordance with the one of the wireless networking standards by loading a third wireless networking firmware being associated with the one of the wireless networking standards into the control unit 12.

In response to activation 23 of the wireless interface 11 for operation in accordance with the one of the wireless networking standards, the control unit 12 may further be configured to let the network device 1 act as an uncommissioned device operating in accordance with the one of the wireless networking standards. For example, the network device 1 may form part of a wireless mesh using a temporary network address.

In response to commissioning of the network device 1 of the wireless interface 11 for operation in accordance with the one of the wireless networking standards, the control unit 12 may further be configured to let the network device 1 act as a commissioned device operating in accordance with the one of the wireless networking standards. For example, the network device 1 may form part of a wireless mesh using a permanent/commissioned network address.

FIG. 2 illustrates a lighting system in accordance with the present disclosure.

The lighting system may comprise one or more network devices 1, such as a gateway 31, a sensor 32, an actor 33, an LED driver 34, and an LED luminaire 35. In particular, the LED driver 34 may form part of the LED luminaire 35. In this exemplary lighting system, the sensor 32 is illustrated as being DC-powered ("="), while all other network devices 1 are shown as being provided with AC power ("~").

In particular, the LED driver 34 may be configured to provide an LED light source of the LED luminaire 35 with the appropriate electrical power by converting the provided AC power to DC power in conformity with the requirements of the LED light source.

In general, also the gateway 31 and the actor 33 may require AC powering to interface with the external network or to perform some kind of electrical and/or mechanical actuation, respectively.

FIG. 3 illustrates a method 2 in accordance with the present disclosure of commissioning a network device 1 of a lighting system.

On the left of FIG. 3, the method 2 comprises advertising 21, over a wireless interface 11 of the network device 1, at least two different wireless networking standards; receiving 22, over the wireless interface 11 of the network device 1, a response to an advertisement of one of the wireless networking standards; and activating 23 the wireless interface 11 for operation in accordance with the one of the wireless networking standards.

The method 2 may be performed by a network device 1 of the first aspect or any of its implementations:

As such, the control unit 12 is configured to advertise 21, over the wireless interface 11, at least two different wireless networking standards. In particular, the wireless networking standards may comprise Bluetooth Mesh, and Matter.

On the right of FIG. 3, further implementation forms of the advertising 21 are suggested:

First, the control unit 12 may further be configured to advertise, over the wireless interface 11, the at least two different wireless networking standards in respective BLE advertisements (reference sign 211), or in a same BLE advertisement (reference sign 212). For example, respective BLE advertisements for Bluetooth Mesh and Matter may be advertised separately, or jointly if so permitted by the involved wireless networking standards.

Second, the control unit 12 may further be configured to advertise 213, over the wireless interface 11, the at least two different wireless networking standards in a same frequency band.

Third, the control unit 12 may further be configured to advertise 214, over the wireless interface 11, the at least two different wireless networking standards using different modulation schemes.

Fourth, the control unit 12 may further be configured to advertise, over the wireless interface 11, the at least two different wireless networking standards concurrently (reference sign 215) or sequentially (reference sign 216).

The above implementation options relating to reference signs 211-216 may be combined with each other unless specifically stated otherwise. For example, it is conceivable that respective BLE advertisements (reference sign 211) may be advertised concurrently (reference sign 215) in a same frequency band (reference sign 213) using different modulation schemes (reference sign 214). For example, it is also conceivable that a same BLE advertisement (reference sign 212) may concurrently (reference sign 215) advertise the at least two different wireless networking standards in a same frequency band (reference sign 213).

The control unit 12 is further configured to receive 22, over the wireless interface 11, a response to an advertisement of one of the wireless networking standards.

The response may comprise a connection request in accordance with the one of the wireless networking standards. For example, the connection request may be a connection request in accordance with the Matter protocol.

The control unit 12 is further configured to activate 23 the wireless interface 11 for operation in accordance with the one of the wireless networking standards.

On the right of FIG. 3, further implementation forms of the activating 23 are suggested:

First, the control unit 12 may further be configured to activate 231 the wireless interface 11 for operation in accordance with the one of the wireless networking standards by disabling a first wireless networking firmware not being associated with the one of the wireless networking standards in the control unit 12. For example, given that the response is in accordance with the Matter protocol, a first wireless networking firmware relating to Bluetooth Mesh may be disabled.

Second, the control unit 12 may further be configured to activate 232 the wireless interface 11 for operation in accordance with the one of the wireless networking standards by enabling a second wireless networking firmware being associated with the one of the wireless networking standards in the control unit 12. For example, given that the response is in accordance with the Matter protocol, a second wireless networking firmware relating to Matter may be enabled.

Third, the control unit 12 may further be configured to activate 233 the wireless interface 11 for operation in accordance with the one of the wireless networking standards by loading a third wireless networking firmware being associated with the one of the wireless networking standards into the control unit 12. For example, given that the response is in accordance with the Matter protocol, a third wireless networking firmware relating to Matter may be loaded from an external storage, such as a flash memory 13 external to the control unit 12 of the network device.

The above implementation options relating to reference signs 231-233 may be combined with each other unless specifically stated otherwise. For example, it is conceivable that activation 23 involves disabling the first wireless networking firmware (reference sign 231), and enabling the second wireless networking firmware (reference sign 232) or loading the third wireless networking firmware.

The invention claimed is:

1. A network device (1) of a lighting system, the network device (1) comprising:
   a wireless interface (11); and a control unit (12), the control unit (12) being configured to:
- transmit (step 21), over the wireless interface (11), at least two different wireless networking standards;
- receive (step 22), over the wireless interface (11), a response for one of the at least two different wireless networking standards; and
- activate (step 23) the wireless interface (11) for operation in accordance with the one of the at least two wireless networking standards for which the response was received.

2. The network device (1) of claim 1, comprising one of: a gateway (31), a sensor (32), an actor (33), an LED driver (34), and an LED luminaire (35).

3. The network device (1) of claim 1, wherein the at least two wireless networking standards comprise Bluetooth Mesh, and Matter.

4. The network device (1) of any claim 1, the control unit (12) further being configured to:
- transmit (step 211), over the wireless interface (11), the at least two different wireless networking standards in respective BLE messages.

5. The network device (1) of claim 1, the control unit (12) further being configured to:
- transmit (step 212), over the wireless interface (11), the at least two different wireless networking standards in a same BLE message.

6. The network device (1) of claim 1, the control unit (12) further being configured to:
- transmit (step 213), over the wireless interface (11), the at least two different wireless networking standards in a same frequency band.

7. The network device (1) of claim 1, the control unit (12) further being configured to:
- transmit (step 214), over the wireless interface (11), the at least two different wireless networking standards using different modulation schemes.

8. The network device (1) of claim 1, the control unit (12) further being configured to:
- transmit (step 215), over the wireless interface (11), the at least two different wireless networking standards concurrently.

9. The network device (1) of claim 1, the control unit (12) further being configured to:
- transmit (step 216), over the wireless interface (11), the at least two different wireless networking standards sequentially.

10. The network device (1) of claim 1, the response comprising a connection request.

11. The network device (1) of claim 1, the control unit (12) further being configured to:
- activate (231) the wireless interface (11) for operation in accordance with the one of the wireless networking standards for which the response was received by disabling a first wireless networking firmware not being associated with the one of the wireless networking standards in the control unit (12).

12. The network device (1) of claim 1, the control unit (12) further being configured to:
- activate (232) the wireless interface (11) for operation in accordance with the one of the wireless networking standards for which the response was received by enabling a second wireless networking firmware being associated with the one of the wireless networking standards in the control unit (12).

13. The network device (1) of claim 1, the control unit (12) further being configured to:
- activate (233) the wireless interface (11) for operation in accordance with the one of the wireless networking standards for which the response was received by loading a third wireless networking firmware being associated the one of the wireless networking standards into the control unit (12).

14. A method (2) of commissioning a network device 5 (1) according to claim 1, the method comprising the steps of:
- transmitting (step 21), over the wireless interface (11), the at least two different wireless networking standards;
- receiving (step 22), over the wireless interface (11), the response for the one of the at least two different wireless networking standards; and
- activating (step 23) the wireless interface (11) for operation in accordance with the one of the at least two wireless networking standards for which the response was received.

* * * * *